United States Patent [19]

Dyer

[11] Patent Number: 5,226,700
[45] Date of Patent: Jul. 13, 1993

[54] COMBINATION BRAKE CONTROLLER AND MONITOR FOR AN ELECTRICAL BRAKING SYSTEM FOR TRAILERS

[76] Inventor: William B. Dyer, 3358 Taylor Rd., Central Point, Oreg. 97502

[21] Appl. No.: 786,610

[22] Filed: Nov. 1, 1991

[51] Int. Cl.$^5$ .............................. B60T 13/74
[52] U.S. Cl. .......................... 303/92; 303/20; 303/7
[58] Field of Search ............. 303/3, 7, 15, 20, 91, 303/92; 340/753, 754; 188/112 R, 112 A

[56] References Cited

U.S. PATENT DOCUMENTS

| | | | |
|---|---|---|---|
| 3,642,328 | 2/1972 | Holland | 188/345 |
| 3,780,832 | 12/1973 | Marshall | 303/7 |
| 3,908,782 | 9/1975 | Lang et al. | 303/7 |
| 3,934,940 | 1/1978 | Schnaibel | 303/92 |
| 4,076,327 | 2/1978 | Hubbard | 303/7 |
| 4,721,344 | 1/1988 | Frait et al. | 303/7 |
| 5,050,937 | 9/1991 | Eccleston | 303/7 |

Primary Examiner—Matthew C. Graham
Attorney, Agent, or Firm—James D. Givnan, Jr.

[57] ABSTRACT

A combination including an electric brake control, ammeter and multiple brackets are disclosed for installation at the driver's station of a trailer towing vehicle. The brackets permit optional mounting of the ammeter on the control. A slotted opening in one of the brackets permits adjustment of the bracket about a horizontal axis for optimum viewing the bracket supported ammeter by the towing vehicle driver and also vertical positioning of the ammeter relative the brake control.

1 Claim, 1 Drawing Sheet

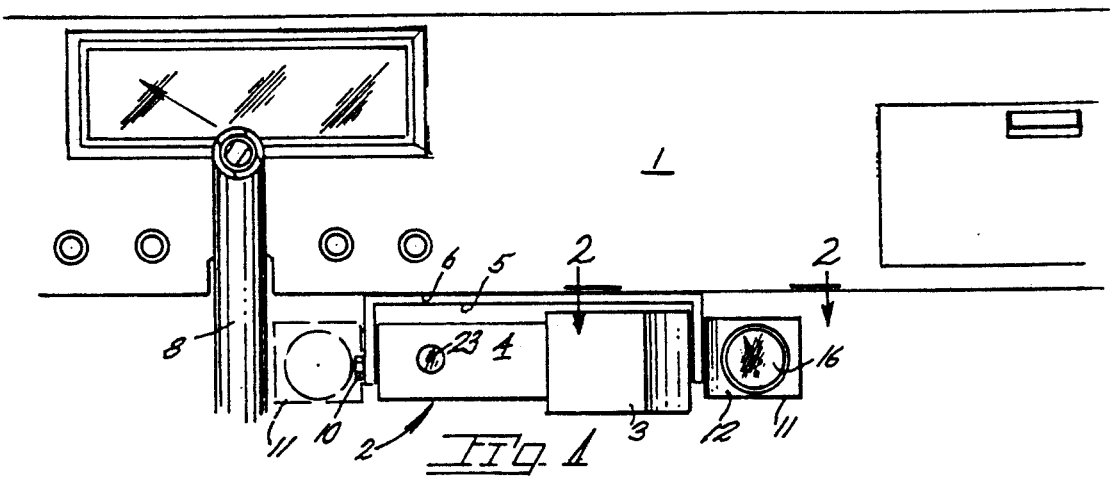
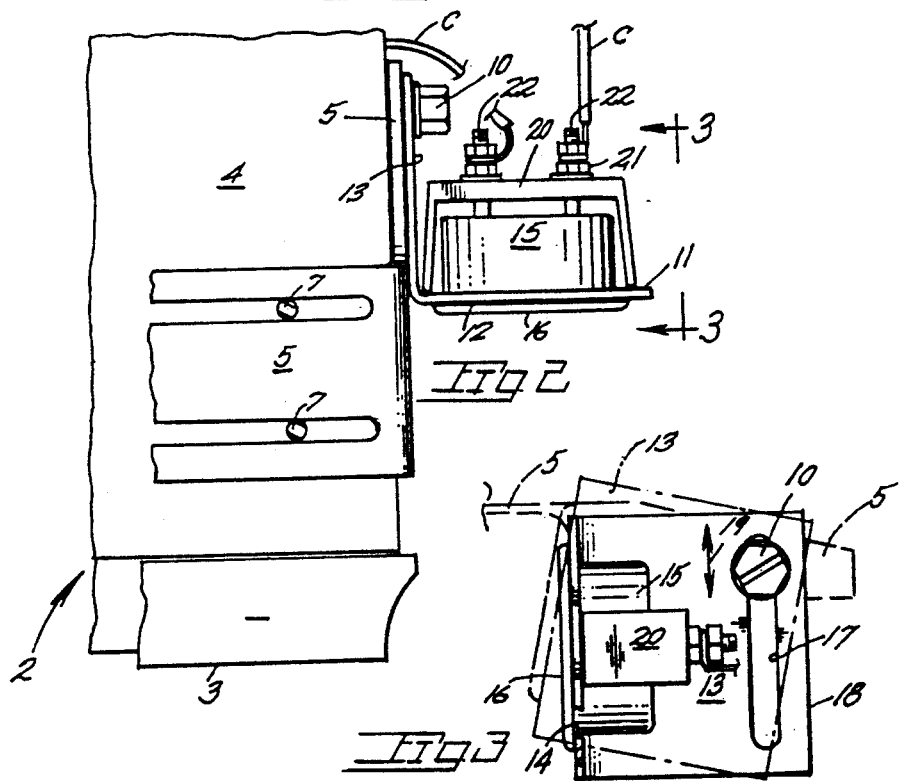
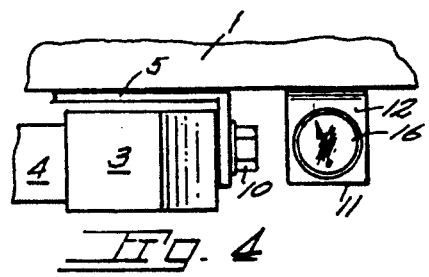

COMBINATION BRAKE CONTROLLER AND MONITOR FOR AN ELECTRICAL BRAKING SYSTEM FOR TRAILERS

BACKGROUND OF THE INVENTION

The present invention pertains generally to brake systems for trailers towed by autos and small trucks.

Typically recreational trailers, of the type commonly towed by autos and pickup trucks, are equipped with electric brakes which include solenoid operated shoes or pads. A brake control or controller in the towing vehicle utilizes a mechanism responsive to towing vehicle velocity changes to generate a signal to the trailer brakes to initiate brake operation. Such trailer braking systems normally draw a known amperage which indicates all of the solenoids in each brake system are functional, and conversely, a lesser amperage is indicative of a malfunctioning solenoid or solenoids. Heretofore, it was the practice to test trailer brakes by application of the tow vehicle's brakes. Brake problems are indicated by poor or asymmetrical braking action of the trailer brakes. The aforementioned control permitted adjustment of the current flow to suit individual driver preferences but such controllers do not indicate the status of the brake solenoids. Hence the first indication of a trailer braking problem is usually uneven braking action of the trailer or reduced braking action.

SUMMARY OF THE PRESENT INVENTION

The present invention is embodied in the combination of an electrical brake controller for a trailer with a bracket mounted ammeter to permit monitoring of a trailer brake system during travel.

An electrical brake controller is equipped with a first bracket for installation below the dashboard of an auto or truck at the driver's station. A fastener element of the bracket lends itself to the securement of a secondary bracket attached in place on the first mentioned bracket. An ammeter is supported by said second bracket in an adjustable or tiltable manner to provide the driver a continuous indication of the electrical condition of the brake solenoids as a malfunction of one or more will result in a drop in amperage. Accordingly a driver is not dependent on a seat-of-the-pants feeling to determine whether one or more trailer brakes is malfunctioning. The ammeter bracket presently utilized is reversible with respect to the supporting controller to permit the vehicle owner to adapt its installation to the most visible location or one of least interference with other dash mounted equipment. Wiring of the presently used ammeter is simplified by the routing of the controller output conductor through the adjacent ammeter in series with the brake solenoids which are in parallel with one another.

Important objectives include the provision of a combination including an electric brake controller for a trailer with an ammeter bracket for mounting of an ammeter in the most visible and practical manner on the controller; the provision of a combined electric brake controller and ammeter in close proximity to one another on one primary bracket for the brake control to avoid the drilling of mounting holes in the tow vehicle dashboard; the provision of a combined electric brake controller and ammeter on the same primary bracket to permit monitoring of the trailer brake system to troubleshoot failures without reliance on actual testing of the brake system on a public thoroughfare.

BRIEF DESCRIPTION OF THE DRAWINGS

In the drawings:

FIG. 1 is a front elevational view of a vehicle dashboard equipped with an electrical brake controller in combination with a bracket and a bracket mounted ammeter;

FIG. 2 is a horizontal sectional view taken along line 2—2 of FIG. 1;

FIG. 3 is a side elevational view taken along line 3—3 of FIG. 2; and

FIG. 4 discloses an optional mounting arrangement of an ammeter in a bracket.

DETAILED DESCRIPTION OF THE PREFERRED EMBODIMENTS

With continuing attention to the drawings, the applied reference numeral 1 indicates the dashboard of an automobile or other vehicle such as a pickup truck both of which are commonly used for towing of recreational trailers.

The following described components include those found in electric brake systems for trailersandwhich avoid interfacing with and adversely affecting the tow vehicle's hydraulic braking system. Indicated generally at 2 is an electric brake control sometimes referred to in the trade as a controller. Such controls are the subject of U.S. Pat. Nos. 3,909,075 and 3,967,863 to mention a few and rely on inertia responsive components responsive to deceleration of the tow vehicle to energize the trailer brakes which act on each wheel of the trailer. Additionally such controls include a manually actuated selector as at 3 for the purpose of selectively applying the trailer brakes. The control 2 serves to provide a selected voltage to a conductor C and to the brake solenoids of the trailer brakes. The voltage, and hence brake action, may be set by adjustment of the selector. The trailer brake solenoids, in parallel, will each draw 3 amps at 12 volts D.C., thus a trailer with four wheels will provide a predetermined cumulative reading on the ammeter of 12 amps assuming all solenoid coils are operable when current is initially applied to the brake system.

The electrical brake control unit housing is indicated at 4 while an inverted U-shaped bracket, hereinafter termed a first bracket, is indicated at 5 and is secured to the underside 6 of the dashboard. Fasteners at 7 secure the first bracket in place in a position both visible and accessible to the driver, as for example, alongside a steering column 8. The control is held in place in said first bracket 5 by a pair of hex head screws at 10.

A second bracket at 11 is of angular configuration having a forward flange 12 and a rearwardly directed flange 13. Forward flange 12 is provided with an aperture 14 of a size to receive an ammeter housing at 15. The ammeter face is at 16. Rearwardly directed flange 13 is provided with a vertically extending slot 17 located adjacent a rearward upright edge 18 of flange 13. Screw 10 extends through opening 17, a rearward extremity of bracket 5 and into a threaded socket in the control. To facilitate an optimum view by the driver, the bracket 11 may be inclined upwardly about the axis of screw 10 as shown in broken lines in FIG. 3 or vertically positioned per arrow 19.

For ammeter securement to front flange 12 of the bracket 11, a clamp at 20 is urged into abutment with the rear side of flange 12 by nut elements 21 which, when tightened, draw the ammeter face into contact with flange 12. The pair of threaded posts 22 additionally serve as binding posts for the ends of a conductor C which carries a current flow from the brake control to the brake solenoids of the trailer. Where an existing, installed control is in place, it is necessary to simply sever the conductor and attach the severed ends thereof to binding posts 22.

In those instances where the ammeter is better viewed by the driver when on the opposite side of the control as shown in broken lines in FIG. 1, the bracket 11 is inverted and relocated to the other side of bracket 5 so as to enable attachment to the control bracket by remaining hex head screw 10 which serves additionally to hold brake control 2 in place in bracket 5.

While existing electric trailer brake control units of the type as at 2 include an indicator light at 23 such is only an indicator that voltage is being applied to controller amplification circuitry upon closure of the tow vehicle's stoplight switch. The intensity of light 23 will thereafter increase proportionately to the increase in brake voltage regulated by the inertia responsive components of the controller and accordingly light 23 does not serve to provide an indication of the electrical integrity of the trailer brake solenoids.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. In combination,
    a trailer brake control unit having a conductor for serving electric brakes of a trailer, said brakes drawing a known cumulative amperage,
    a first bracket for mounting said control unit at the driver's station of a trailer towing vehicle,
    a second bracket coupled to said first bracket and including a flange defining an aperture, a fastener joining the first and second brackets,
    an ammeter mounted in the second bracket in circuit with said conductor to permit monitoring of the amperage drawn by the brakes when energized to detect a malfunctioning system upon a higher or lower indicated amperage being indicated than said known cumulative amperage, and
    said second bracket of angular configuration having front and rearwardly directed flanges perpendicularly disposed to one another, said rearwardly directed flange defining a slot adjacent the extremity of the flange for the reception of said fastener engageable with said first bracket, said second bracket and said ammeter positionable both about and perpendicular to the major axis of said fastener to enable optimum viewing of the ammeter by a driver.

* * * * *